US008508765B2

(12) United States Patent
Lee

(10) Patent No.: US 8,508,765 B2
(45) Date of Patent: Aug. 13, 2013

(54) METHOD AND SYSTEM FOR TRANSMITTING SCANNED DATA TO HOST FROM NETWORK SCANNER

(75) Inventor: Hak-ju Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1055 days.

(21) Appl. No.: 11/480,507

(22) Filed: Jul. 5, 2006

(65) Prior Publication Data

US 2007/0024900 A1 Feb. 1, 2007

(30) Foreign Application Priority Data

Jul. 26, 2005 (KR) .................... 10-2005-0067845

(51) Int. Cl.
*G06F 3/12* (2006.01)
(52) U.S. Cl.
USPC ............ 358/1.15; 358/1.1; 358/400; 358/474
(58) Field of Classification Search
USPC .................. 358/1.1, 1.15, 400, 474
See application file for complete search history.

(56) References Cited

U.S. PATENT DOCUMENTS

| 6,147,775 A * | 11/2000 | Mori ............................ 358/468 |
| 2003/0223363 A1 * | 12/2003 | Sato ............................. 370/230 |
| 2004/0111343 A1 * | 6/2004 | Lindvall et al. ................ 705/35 |
| 2004/0193748 A1 * | 9/2004 | Sugimoto ....................... 710/15 |
| 2004/0212842 A1 * | 10/2004 | Miyamoto et al. ............. 358/407 |
| 2004/0213232 A1 * | 10/2004 | Regan ........................... 370/390 |
| 2004/0215759 A1 * | 10/2004 | Takahashi et al. ............. 709/223 |
| 2005/0066072 A1 | 3/2005 | Nakamura ........................ 710/8 |
| 2005/0073716 A1 * | 4/2005 | Maki ........................... 358/1.15 |
| 2005/0152287 A1 * | 7/2005 | Yokomitsu et al. ........... 370/255 |
| 2005/0180398 A1 * | 8/2005 | Deno et al. .................... 370/352 |
| 2005/0229219 A1 * | 10/2005 | Posabella et al. ............... 725/87 |

FOREIGN PATENT DOCUMENTS

| CN | 1518329 | 8/2004 |
| JP | 2001-117834 | 4/2001 |
| JP | 2002-007133 | 1/2002 |
| JP | 2004-341731 | 12/2004 |

* cited by examiner

*Primary Examiner* — Benny Q Tieu
*Assistant Examiner* — Martin Mushambo
(74) *Attorney, Agent, or Firm* — Roylance, Abrams, Berdo & Goodman, L.L.P.

(57) ABSTRACT

A method and system for transmitting scanned data from a network scanner to a host are provided, in which a port is set in the host to receive the scanned data when the host and the scanner are connected via a network, the host is accessed from the scanner to detect port information regarding the set port, and the scanned data is transmitted from the scanner to the host via the port corresponding to the detected port information. Therefore, the inconvenience of having to search a scanner from a host and then receiving scanned data when using a network scanner is eliminated and the scanned data can be directly transmitted from the network scanner to the host.

8 Claims, 5 Drawing Sheets

METHOD AND SYSTEM FOR TRANSMITTING SCANNED DATA TO HOST FROM NETWORK SCANNER

CROSS-REFERENCE TO RELATED PATENT APPLICATIONS

This application claims the benefit under 35 U.S.C. §119 (a) of Korean Patent Application No. 10-2005-0067845, filed on Jul. 26, 2005 in the Korean Intellectual Property Office, the entire disclosure of which is hereby incorporated by reference.

BACKGROUND OF THE INVENTION

1. Field of the Invention

The present invention relates to network scanning. More particularly, the present invention relates to a method and system for directly transmitting scanned data from a network scanner to a host without operating the host.

2. Description of the Related Art

A host and a scanner form a network for performing a network scanning operation. The scanning operation includes, first, setting a port of the host to receive scanned data. Thereafter, a scanner to perform the scanning operation is searched and set port information is transmitted to the scanner. The scanner registers the port to which the scanned data is to be transmitted using the received port information. The scanner transmits the scanned data to the host via the registered port after performing the scanning operation.

However, setting a port for receiving scanned data in a host, transmitting information on a port selected by a user to a scanner, and registering the received port by the scanner is inconvenient, as in a conventional network scanning method. Therefore, scanned data cannot be independently transmitted to a port of a host by a scanner without an operation of the host.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and system for transmitting scanned data from a network scanner to a host so that the scanned data can be transmitted directly from the scanner to the host without receiving information on a port set in the host from the host.

According to an aspect of exemplary embodiments of the present invention, there is provided a method of transmitting scanned data from a network scanner to a host, in which a port is set in the host to receive the scanned data when the host and the scanner are connected via a network; the host is accessed from the scanner to detect port information regarding the set port; and the scanned data is transmitted from the scanner to the host via the port corresponding to the detected port information.

According to another aspect of exemplary embodiments of the present invention, there is provided a system for transmitting scanned data from a network scanner to a host, the host and the scanner being connected via a network, in which the host includes a port setting unit, and the scanner includes a port information detecting unit which accesses the host to detect port information regarding a set port; and a data transmitting unit transmits the scanned data to the host via the set port corresponding to the detected port information.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
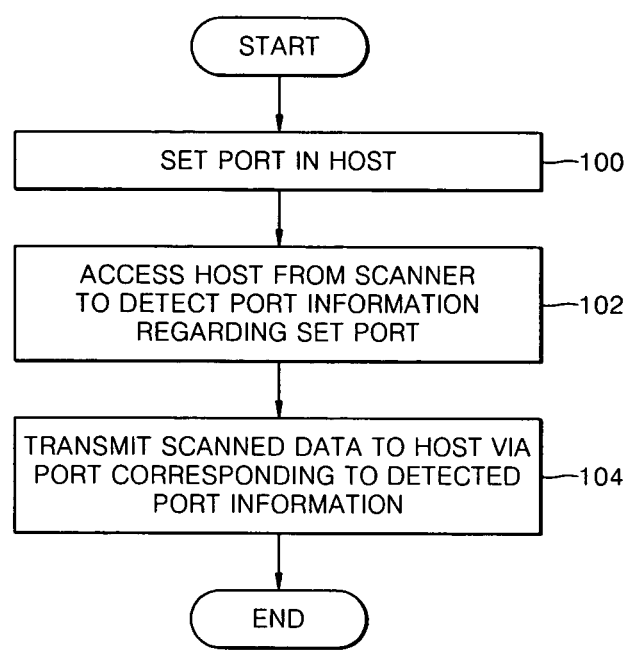
FIG. 1 is a flow chart illustrating a method of transmitting scanned data from a network scanner to a host according to an exemplary embodiment of the present invention.

FIG. 1 is a flow chart illustrating a method of transmitting scanned data from a network scanner to a host according to an exemplary embodiment of the present invention.

First, when the host and the scanner are connected via a network, a port in the host for receiving scanned data is set (operation 100).

The host subdivides a setting region of the port into predetermined ranges. For example, the host can specify a first port region as port numbers ranging from 5500 to 5510, a second port region as port numbers ranging from 6500 to 6510, a third port region as port numbers ranging from 7500 to 7510, a fourth port region as port numbers ranging from 8500 to 8510, and a fifth port region as port numbers ranging from 9500 to 9510. By subdividing the setting region of the port, the time taken to search set ports in the scanner to transmit scanned data, which will be described later, can be minimized.

As described above, one of the ports in the subdivided port setting regions is set as the port to receive scanned data.

Figure 2:
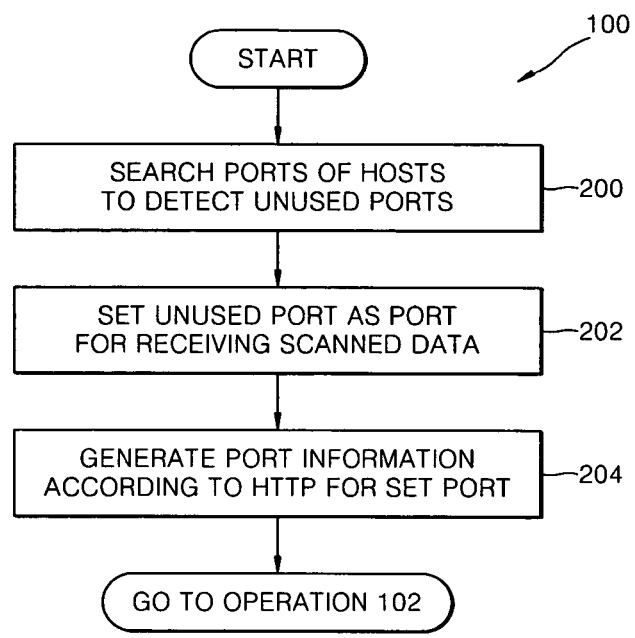
FIG. 2 is a flow chart illustrating a method of setting a port in the host described in FIG. 1 according to an exemplary embodiment of the present invention.

FIG. 2 is a flow chart illustrating the setting of the port in the host (operation 100) described in FIG. 1.

First, ports of the host are searched to detect unused ports (operation 200). Ports that are not currently in use among a plurality of ports included in the host are detected.

After operation 200, one of the unused ports is set as the port to receive scanned data (operation 202).

After operation 202, hypertext transfer protocol (HTTP) port information of the set port is generated and stored (operation 204). HTTP is a communication standard used for exchanging hypertext documents between a web server and a client browser in the Internet.

By generating port information according to HTTP, the scanner can access information on the set port in the host via the web server, which will be described later.

Referring back to FIG. 1, after operation 100, the scanner accesses the host to detect information on the set port (operation 102).

Figure 3:
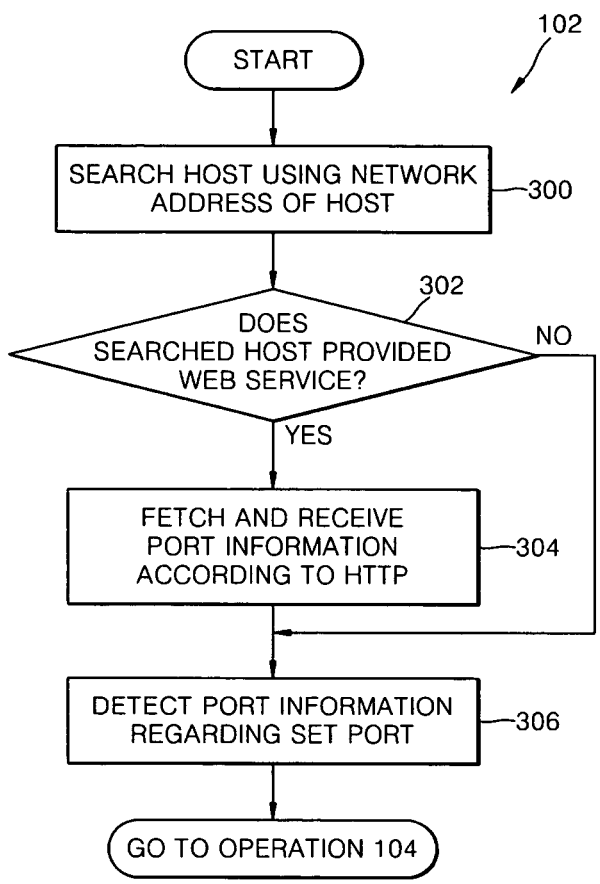
FIG. 3 is a flow chart illustrating a method of accessing the host from the scanner to detect port information regarding the set port described in FIG. 1.

FIG. 3 is a flow chart illustrating the accessing of the host from the scanner to detect the port information regarding the set port (operation 102) described in FIG. 1.

First, a host is searched using a network address of the host (operation 300). The network address of the host can be stored in the scanner in advance, or a user can directly input the network address. A search is conducted to determine whether the host corresponding to the network address input by the user using the scanner is forming a network with the scanner.

After operation 300, a determination is made as to whether the searched host is provided with a web service (operation 302). When the host corresponding to the network address input by the user is searched, a determination is made as to whether a web service which provides various online services is provided in the host. Here, the searched host may be provided with one of an Internet and an intranet as the web service. The Internet is a vast collection of inter-connected networks, and the intranet is an information system which shares data within a specific organization on a small scale using Internet technology and network standards.

If the searched host is provided with a web service, HTTP port information is fetched and received (operation 304). If the searched host is provided with a web service, the scanner can receive a document according to HTTP. Therefore, previously stored HTTP port information in the searched host is fetched and received.

After operation 304, the received port information is interpreted to detect port information regarding the set port (operation 306). By interpreting the HTTP port information, port information set by the host for receiving previously scanned data is detected.

In operation 302, if the searched host is not provided with a web service, the process moves on to operation 306. If the searched host is not provided with a web service, the scanner cannot fetch and receive port information according to HTTP. Therefore, the scanner directly searches ports of the searched host sequentially to detect a previously set port by the host. Since the scanner searches sequentially, a lot of time is consumed. As described above, by the host subdividing the setting region of the port into predetermined ranges, the setting regions for searching the port are limited to small ranges, thereby reducing the time consumed for detecting the port.

Figure 4A:
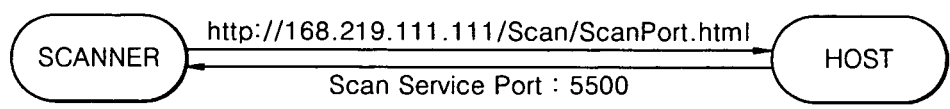
FIGS. 4A and 4B are views for explaining how the scanner detects port information set in the host according to an exemplary embodiment of the present invention.
Figure 4B:
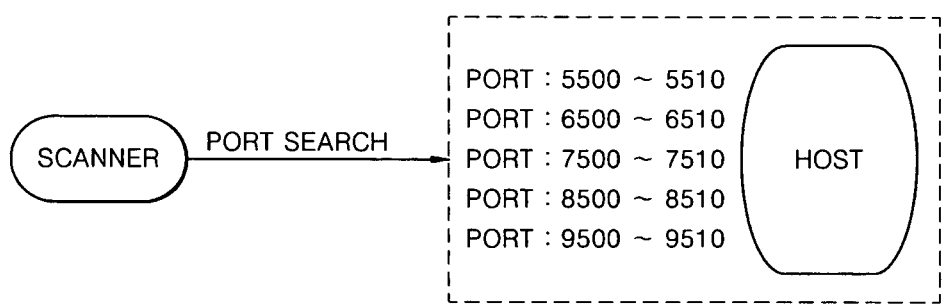

FIGS. 4A and 4B are views for explaining how the scanner detects the set port information in the host.

FIG. 4A is a view for illustrating a process of detecting the set port information from the host when the searched host receives a web service, and FIG. 4B is a view for illustrating a process of sequentially scanning the port setting regions of the searched host to detect the set port information.

After operation 102, the scanned data scanned by the scanner is transmitted to the host via the port corresponding to the detected port information (operation 104).

In operation 102, when the port information is detected, the scanned data is transmitted to the port of the host corresponding to the detected port information.

The method of transmitting the scanned data from the network scanner to the host of the present invention described above can be embodied as computer readable codes/instructions/programs, and can be implemented in general-use digital computers that execute the codes/instructions/programs using a medium, for example, a computer readable recording medium.

Examples of the computer readable recording medium include magnetic storage media (for example, ROM, floppy disks, hard disks, magnetic tapes, and the like), optical recording media (for example, CD-ROMs or DVDs), and storage media such as carrier waves (for example, transmission through the Internet). In addition, the computer readable recording medium can also be distributed over network coupled computer systems so that the computer readable codes/instructions/programs can be stored and executed in a distributed fashion. Also, functional programs, codes, and code segments for implementing certain exemplary embodiments of the present invention can be easily construed by programmers skilled in the art to which the present invention pertains.

Hereinafter, a system for transmitting scanned data from a network scanner to a host of the present invention will now be described more fully with reference to the accompanying drawings, in which exemplary embodiments of the present invention are shown.

Figure 5:
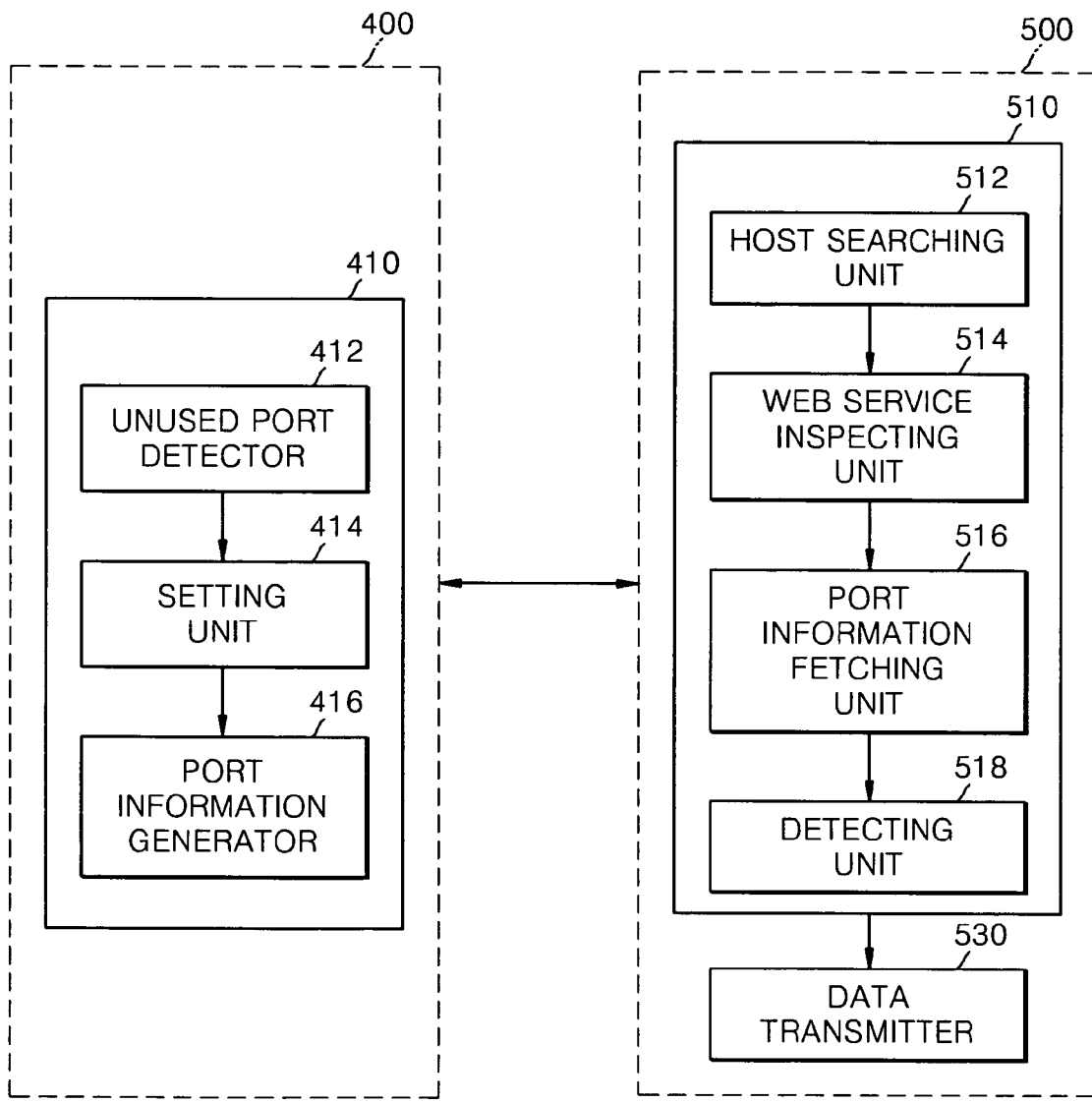
FIG. 5 is a block diagram illustrating a system for transmitting scanned data from a network scanner to a host according to an exemplary embodiment of the present invention.

FIG. 5 is a block diagram illustrating a system for transmitting scanned data from a network scanner to a host according to an exemplary embodiment of the present invention. The system includes a host 400 and a scanner 500 forming a network with the host 400.

The host 400 includes a port setting unit 410.

The port setting unit 410 sets a port for receiving the scanned data generated in the scanner 500.

The port setting unit 410 subdivides a port setting region into predetermined ranges. By subdividing the port setting region, less time is spent searching for the port set for transmitting the scanned data from the scanner 500.

To perform the function described above, the port setting unit 410 includes an unused port detector 412, setting unit 414, and port information generator 416.

The unused port detector 412 searches ports of the host 400 to detect ports that are not currently in use among a plurality of ports, and outputs the result to the setting unit 414.

The setting unit 414 responds to the result output from the unused port detector 412 and sets one of the unused ports as the port to received scanned data and outputs the setting result to the port information generator 416.

The port information generator 416 generates port information according to HTTP regarding the port set in the setting unit 414. Since the port information generator 416 generates the HTTP port information, the scanner 500 can access information on the port set in the host 400 via a web service.

The scanner 500 includes a port information detecting unit 510 and a data transmitting unit 530.

The port information detecting unit 510 accesses the host 400 to detect port information on the set port.

To perform the function described above, the port information detecting unit 510 includes a host searching unit 512, web service inspecting unit 514, port information fetching unit 516, and detecting unit 518.

The host searching unit 512 searches the host 400 using a network address of the host 400, and outputs the result to the web service inspecting unit 514.

The network address of the host 400 may be stored in the scanner 500 in advance, or a user may directly input the network address. The host searching unit 512 searches whether the host 400 corresponding to the network address forms a network with the scanner 500.

The web service inspecting unit 514 inspects whether the host 400 searched by the host searching unit 512 is provided with a web service, and outputs the result to the port information fetching unit 516.

The web service inspecting unit 514 inspects whether the host 400 is provided with the Internet or an intranet as the web service.

The port information fetching unit 516 fetches and receives HTTP port information from the host 400 if the searched host 400 is provided with a web service, and outputs the received port information to the detecting unit 518.

If the searched host 400 is provided with a web service, the scanner 500 can receive HTTP documents. Therefore, the port information fetching unit 516 fetches HTTP port information previously stored in the searched host 400 and receives the fetched HTTP port information.

The detecting unit 518 interprets the port information provided from the port information fetching unit 516 and detects port information regarding the port set in the host 400, and outputs the detected port information to the data transmitting unit 530.

If the searched host 400 is not provided with a web service, the scanner 500 cannot fetch and receive HTTP port information.

Therefore, the detecting unit 518 directly searches ports of the searched host 400 sequentially to detect a port previously set by the host 400. A lot of time is consumed because the detecting unit 518 searches the ports sequentially. Thus, as described above, the time consumed for searching the port can be reduced by the port setting unit 410 subdividing a setting region of the port into predetermined ranges.

The data transmitting unit 530 transmits the scanned data to the host 400 via a port corresponding to the port information detected by the detecting unit 518.

A method and system for transmitting scanned data from a network scanner to a host according to exemplary embodiments of the present invention eliminates the inconvenience of having to search a scanner from a host and then receiving scanned data when using a network scanner. In addition, the scanned data can be directly transmitted from the network scanner to the host.

While the present invention has been particularly shown and described with reference to certain exemplary embodiments thereof, it will be understood by those skilled in the art that various changes in form and details may be made therein without departing from the spirit and scope of the present invention as defined by the following claims.

What is claimed is:

1. A method of transmitting scanned data from a network scanner to a host, the network scanner and the host connected via a network assigning an Internet Protocol (IP) address to a device participating in the network, the method comprising:
    accessing the host from the network scanner using the IP address of the host, by the network scanner;
    obtaining, by the network scanner, information regarding at least one scan service port of the host according to a hypertext transfer protocol (HTTP) via the access;
    detecting, by the network scanner, the scan service port of the host based on the obtained information according to the HTTP, the scan service port being a port number associated with an IP address of the host and used by a server running a service on the host for receiving scanned data from a scanning operation independently initiated by any network scanner in the same network; and
    transmitting the scanned data from the network scanner to the host via the detected scan service port.

2. The method of claim 1, wherein the detecting of the scan service port comprises:
    accessing the host from the network scanner, sequentially inspecting port numbers designated for a scan service in the host, and detecting the scan service port.

3. The method of claim 1, wherein the web service provided to the host over at least one of an Internet and an intranet.

4. A method of transmitting scanned data from a network scanner to a host, the network scanner and the host connected via a network assigning an Internet Protocol (IP) address to a device participating in the network, the method comprising:
    generating and storing, in the host, port information according to a hypertext transfer protocol (HTTP) including information regarding a scan service port, the scan service port being a port number associated with an IP address of the host and used by a server running a service on the host for receiving scanned data from a scanning operation independently initiated by any network scanner in the same network;
    if the host is provided with a web service, accessing the host from the network scanner using the IP address of the host, reading, by the network scanner, the port number information stored in the host according to the HTTP and extracting the scan service port included in the port number information according to the HTTP via the web service; and
    transmitting the scanned data from the network scanner to the host via the extracted scan service port.

5. A system for transmitting scanned data from a network scanner to a host, the host and the network scanner connected via a network assigning an Internet Protocol (IP) address to a device participating in the network, wherein the network scanner comprises:
    a port information detector for accessing the host using the IP address of the host from the network scanner, for obtaining information regarding at least one scan service port of the host according to a hypertext transfer protocol (HTTP) via the access and for detecting the scan service port based on the obtained information according to the HTTP, the scan service port being a port number associated with an IP address of the host and used by a server running a service on the host for receiving scanned data from a scanning operation independently initiated by any network scanner in the same network; and
    a data transmitting unit for transmitting scanned data from the network scanner to the host via the detected scan service port.

6. The system of claim 5, wherein the port information detector accesses the host from the network scanner, sequentially inspects port numbers designated for a scan service in the host, and detects the scan service port.

7. A system for transmitting scanned data from a network scanner to a host, the host and the network scanner connected via a network assigning an Internet Protocol (IP) address to a device participating in the network, wherein the host generates and stores port number information according to a HTTP including information regarding a scan service port, the scan service port being a port number associated with an IP address of the host and used by a server running a service on the host for receiving scanned data from a scanning operation independently initiated by any network scanner in the same network, the network
    scanner accessing the host using the IP address of the host, wherein the network scanner comprises:

a web service inspecting unit for inspecting whether the host is provided with a web service;

a port information fetching unit for fetching port number information stored in the host according to the HTTP via the web service if the host is provided with the web service; and a detecting unit for interpreting the fetched port information according to the HTTP and detecting a scan service port included in the port information according to the HTTP; and a data transmitting unit for transmitting the scanned data from the network scanner to the host via the detected scan service port.

8. The system of claim 7, wherein the web service is provided to the host over at least one of an Internet and an intranet.

* * * * *